United States Patent [19]

Stiles

[11] 3,858,451
[45] Jan. 7, 1975

[54] ACCELERATION DETERMINING METHODS AND APPARATUS

[75] Inventor: John C. Stiles, Morris Plains, N.J.

[73] Assignee: The Singer Company, Little Falls, N.J.

[22] Filed: Apr. 9, 1973

[21] Appl. No.: 349,090

[52] U.S. Cl. ............................................. 73/517 B
[51] Int. Cl. ........................................ G01p 15/08
[58] Field of Search .......... 73/516 R, 517 R, 517 B, 73/505; 308/10

[56] References Cited
UNITED STATES PATENTS
3,148,456  9/1964  Browning ...................... 73/505 X

*Primary Examiner*—James J. Gill
*Attorney, Agent, or Firm*—T. W. Kennedy

[57] ABSTRACT

Acceleration is determined by measurement of differential voltages between a pair of opposed electrodes which maintain a sensing mass in preselected position therebetween. The disclosure pertains further to preferred electrode configuration for improving electrostatic field uniformity in accelerometers.

14 Claims, 3 Drawing Figures

Patented Jan. 7, 1975

3,858,451

3,858,451

ACCELERATION DETERMINING METHODS AND APPARATUS

FIELD OF THE INVENTION

This invention relates to methods and apparatus for determining acceleration and more particularly to accelerometers of the type including an electrically-suspended sensing mass.

BACKGROUND OF THE INVENTION

In determining acceleration of objects by measurement of displacement of acceleration-sensitive mass, attainable resolution is limited in significant part by physical impediments to motion of the mass. Hence, various prior art efforts have centered on the elimination of physical contact between the mass and its immediate environment, an objective particularly difficult to accomplish where the mass is to have omnidirectional freedom of movement for the determination of accelerations along multiple axes.

One type of accelerometer resulting from these efforts provides for the electrical self-suspension of a self-charging mass. The mass, incorporating radioactive material, emits alpha and beta rays, thus leaving itself in varying electrically charged state. Disposed interiorly of a dielectric housing, the mass establishes an electrical charge relationship between itself and the housing such that it is disposed in position free from physical contact with the housing. A sensor assembly, typically a light source and associated photodetectors, monitors the position of the mass relative to its initial position and provides output indication of the same.

By reason of the dependency of mass position on self-generated electrostatic fields, generally of character not known with precision and exhibiting non-linearity, particularly at high accelerations, this type of accelerometer provides a less than desirable measure of acceleration.

In another type of accelerometer resulting from these efforts, electrical charge is applied to a sensing mass not of the self-charging variety and the mass is disposed in the interior of a housing having facing electrode pairs which establish electrostatic fields for positioning the mass. A potential difference is established between each electrode air by circuit means responsive to output indications of a sensor assembly, such as that discussed above, to support the mass in preselected position.

This latter type of accelerometer exhibits operational shortcomings in that its scale factor varies from one use to the next. Thus, the mass charge, variable with time, need be determined prior to each use of the accelerometer. Furthermore, the charge that can be placed on the mass is undesirably limited in magnitude. Moreover, with its presently known electrode configuration, this accelerometer is subject to error attributable to non-uniformity of electrostatic fields in the zone in which the mass thereof is displaceable in use.

SUMMARY OF THE INVENTION

It is an object of this invention to provide improved methods and apparatus for determining acceleration and more particularly to improved accelerometers of the type having an electrically-suspended acceleration-sensitive mass.

In attaining this and other objects, the invention provides an accelerometer wherein a mass exhibiting electrical charge is associated with electrode means generating electrostatic fields cooperative with the mass in positioning the same. In a further aspect, the invention provides an accelerometer having a housing, a mass exhibiting electrical charge disposed therein and electrode means for subjecting the mass to selected electrostatic fields of a high degree of uniformity in the zone in which the mass is displaceable during use of the accelerometer. In operation, such apparatus embraces methods of the invention for use in determining acceleration.

The foregoing and other objects and features of the invention will be evident from a consideration of the following detailed discussion of preferred embodiments and practices of the invention and from the drawings thereof wherein like reference numerals are employed throughout for identification of like parts.

DESCRIPTION OF PREFERRED EMBODIMENTS AND PRACTICES

Figure 1:
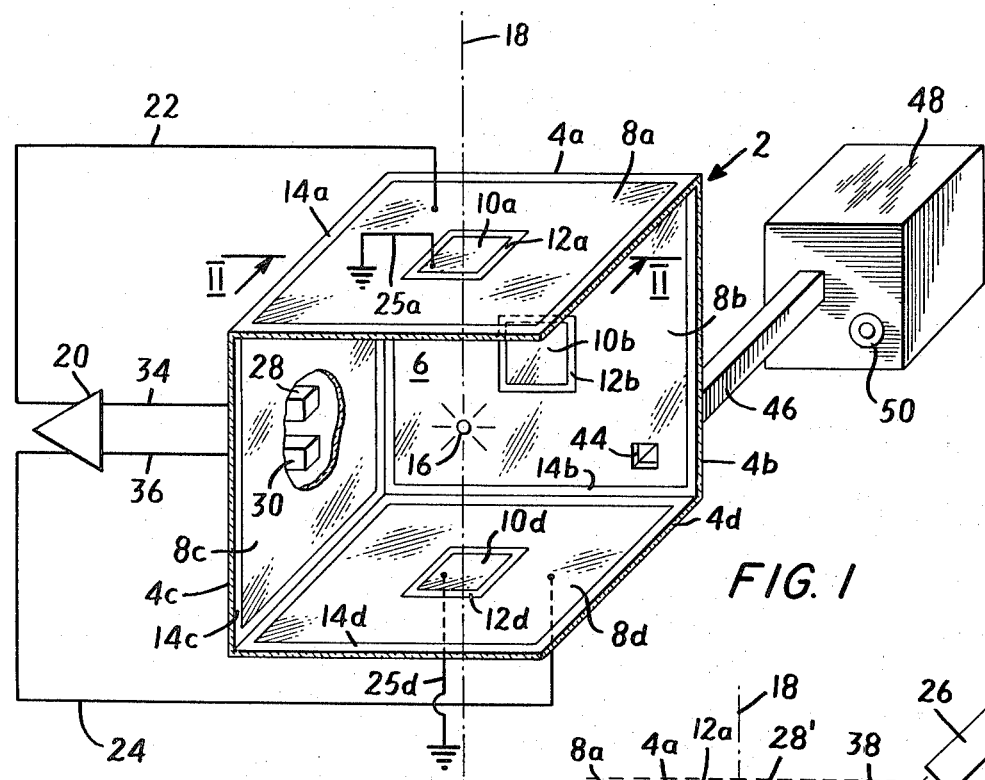
FIG. 1 is a schematic drawing of acceleration determining apparatus and circuit means in accordance with the invention broken away in part to show detail.

Referring to FIG. 1, a partially evacuated cubical housing 2 is defined by faces 4a–d and remaining faces removed for purposes of explanation. Associated with faces 4a–d are electrode means, supported adjacent the interior 6 of housing 2. For purposes discussed in detail below, the electrode means are desirably comprised of outer conductors, 8a–d, and inner conductors, 10a–d, preferably of square configuration and insulated from one another, and from other electrodes, respectively by minute insulative spacers, 12a–d and 14a–d. The housing is fixedly supported by an object whose acceleration is to be determined.

An acceleration-sensitive mass 16 is disposed in housing interior 6 and comprises a self-charging member, such as a radioactive particle, e.g., Strontium silicate made with Strontium 90, obtainable commercially from such sources as the Oak Ridge Isotope Development Center and the Nuclear Products Department of the 3M Company. In such preferred composition, mass 16 radiates high energy beta rays (electrons), thus leaving itself with a net positive charge constantly increasing with the passage of time. The mass may alternatively be comprised of a member emitting alpha rays.

Mass 16 is maintained in substantially central position in housing interior 6 by electrostatic fields generated therein by the electrode means. For simplicity of explanation, operation of the FIG. 1 apparatus will be discussed only in connection with acceleration along axis 18, i.e., vertical acceleration of housing 2. Electrodes 8a–10a and 8d–10d comprise the electrodes which generate electrostatic fields for positioning mass 16 along axis 18 and all axes parallel to axis 18. Electrodes 8a and 8d each receive voltage from differential amplifier 20, respectively over lines 22 and 24. Lines 25a and 25d are connected to electrodes 10a and 10d for maintaining these electrodes at other potentials, e.g., zero potential. As will be appreciated, like circuit means are associated with the remaining electrode means of the FIG. 1 apparatus where acceleration is to be measured along other axes.

Figure 2:
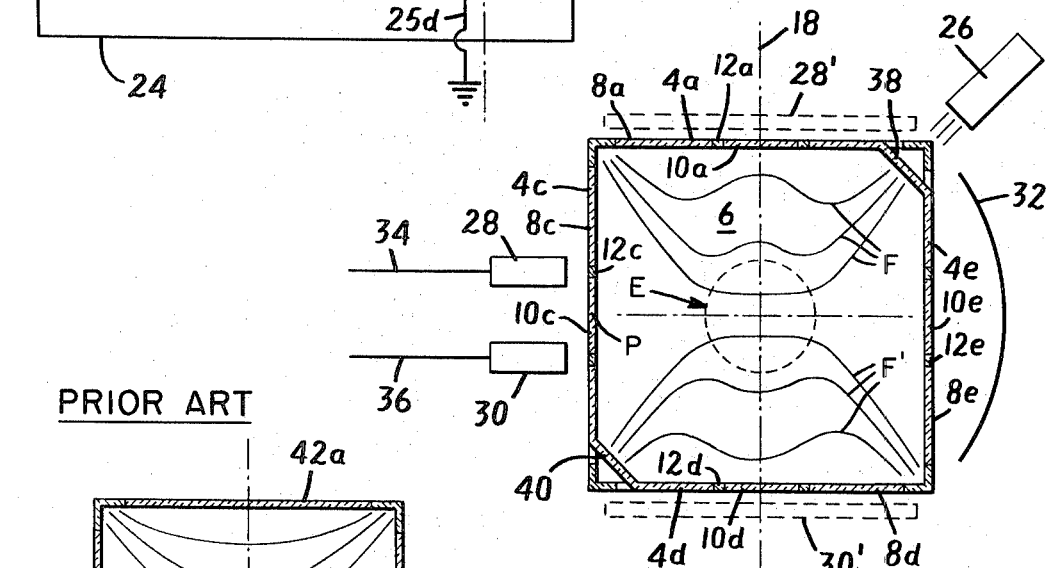
FIG. 2 is a sectional view of the FIG. 1 apparatus as seen along lines II—II.

Referring now also to FIG. 2, a sensor assembly for detecting the position of mass 16 along axis 18 may typically comprise a radiant energy source 26 emitting a collimated beam of light, sensor elements 28 and 30 disposed centrally of housing face 4c, and reflective means, such as spherical mirror 32 having focal point P. Source 26 may comprise a laser or the like, the output radiation of which is scattered by mass 16 onto elements 28 and 30, e.g., photodetectors. The photodetectors are connected to differential inputs of amplifier 20 respectively by lines 34 and 36. In operation, as housing 2 is displaced relative to mass 16 upon acceleration of an object to which the housing is fixed, photodetector 28 will receive a greater amount of light scattered by the mass than will photodetector 30 and line 34 will accordingly provide a higher amplitude input signal to amplifier 20 than will line 36. Responsive to such input conditions, amplifier 20 is operative to provide a voltage differential between lines 22 and 24, accordingly providing a voltage differential between electrodes 8a and 8d. The electordes in turn establish an electrostatic field which exerts force on mass 16 to return the same to its central position in housing interior 6.

Measurements of relative displacement between housing 2 and mass 16 may be obtained alternatively by substituting, for source 26 and photodetectors 28 and 30, beta ray detectors 28' and 30' shown in broken line in FIG. 2. As such displacement occurs, one of these detectors will receive more beta radiation than the other and generates a larger output signal. Amplifier 30 receives inputs from these detectors and acts as above-discussed.

Housing 2 is preferably constructed of material transparent to radiant energy emitted by source 26. The electrode means, also preferably transparent, may be secured to the housing faces or may be formed integrally therewith. In the FIG. 2 showing, housing face 4b is omitted for clarity and housing face 4e is included. The housing desirably includes a planar window 38 disposed transverse to the emission axis of source 26 and may include a radiant energy absorber in association with planar section 40 to minimize stray energy at the photodetectors.

Figure 2A:
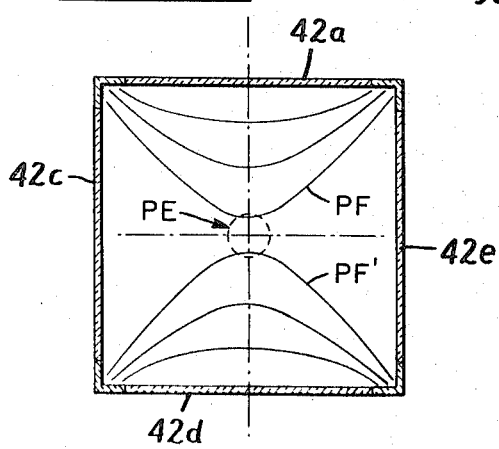
FIG. 2a illustrates a prior art electrode configuration and electrostatic fields generated thereby.

Equipotential surfaces F and F' are defined respectively by electrodes 8a–10a and 8d–10d. These surfaces define a particularly uniform field region in an extended zone E of housing interior 6. This is in substantial contrast to the situation resulting when electrodes such as in the prior art showing of FIG. 2a are employed. These electrodes, 42a–d define continuous conductors in facing relation to the interior of a cubical housing. As will be seen in FIG. 2a, the electrostatic fields generated respectively by electrodes 42a and 42d define equipotential surfaces PF and PF' which exhibit marked curvature and provide for a uniform field region only in a quite limited zone PE.

An improvement in electrostatic field uniformity may be attained by the present invention, by which the volume of uniform field may be increased by a factor of greater than one thousand, when electrodes of the type illustrated in FIG. 1 are employed rather than the electrodes in FIG. 2a. While the particularly illustrated improved electrode arrangement comprises an outer square conductor and an inner square conductor mutually insulated, such configuration may be varied extensively and yet permit attainment of the foregoing improvement. For instance, the inner and outer electrodes may be of circular or other form and additional interior electrodes may be employed, for example, a further square electrode may be disposed within electrode 10a and mutually insulated therefrom by a minute insulative spacer. In point of function, it is believed that field uniformity is attained particularly by the corrective effect of the inner electrode on the field which is generated by the outer electrode. Different measures of corrective influence may be attained by selecting different potentials for the inner electrode. In general, the inner electrode is maintained at zero potential. In particular applications, such inner electrode may be maintained at a potential greater than zero and of either the same or opposite polarity as the potential applied to the outer electrode.

Scale factor and scale factor constancy in accelerometers of the invention are dependent on the magnitude of the electrical charge of mass 16 and its constancy, in turn dependent on the pressurization of housing interior 6. In accordance with the invention, housing 2 is provided with a pressurization port 44, e.g., in housing face 4b, and the port is coupled to ancillary apparatus comprising conduit 46 and a source 48 of pressurized gas. Prior to use of the accelerometer, pressure controller 50 is adjusted such that desired gas pressurization is provided within housing 2. Port 44 is then decoupled from conduit 46 and closed. The housing is hermetically sealed throughout use of the accelerometer.

In use of such ancillary apparatus, the admission of gas to the housing interior results in gas ionization under beta ray irradiation producing positive and negative pairs of ions. While these pairs generally recombine after a period of time in the absence of a strong field gradient, the increasing charge of mass 16 gives rise to increasing field gradients with the result that negative members of the ion pairs are attracted to the mass and hence compensate the mass for its lost negative charge carried away by beta radiation, i.e., replenish the negative mass charge. Evidently, field gradient and hence mass potential are dependent upon the number of ion pairs and recombination time. By regulating the pressure upon the gas admitted into the cube, steady state conditions may be attained whereby mass electrical charge may be rendered substantially constant at any desired potential. The invention contemplates the adjustment of scale factor by varying the initially selected pressurization of housing interior 6, for example, by leaking gas therefrom.

The foregoing embodiment of an accelerometer according with the invention is definitive of the methods underlying the invention which involve an initial step of defining a volume, e.g., housing interior 6, fixedly positioned relative to the object whose acceleration is to be determined. Once such volume is defined, a self-charging mass exhibiting electrical charge is disposed therein. The volume is next subjected to preselected gas pressurization. Preferably, the mass is radioactive and emits substantially only beta rays, thereby acquiring positive charge as above discussed. However, the mass may comprise any relatively mobile element, supportable by electrostatic fields, which exhibits initial electrical charge and, on preselected gas pressurization, thereafter exhibits a constant charge.

Following practice of these preliminary steps, measurements are made of each displacement of the mass along the axis or axes of concern and the mass is directed into preselected position in the volume by establishing along a particular axis or axes therein electrostatic fields acting on the mass and according in strength with such measurements. In the methods of the invention, such fields are generated by an agency additional to the mass itself, e.g., opposed electrodes and means establishing a differential voltage therebetween, such that mass positioning is not completely dependent upon mass charge itself. The method may include the additional step of conforming such electrostatic fields to the preselected configuration in FIG. 2, such step being practiced by arranging the electrodes in the FIG. 1 or related configuration, preferably providing a zero potential expanse centrally in the faces defining the volume.

The measuring steps may be accomplished by applying radiant energy to the mass and determining the relative amounts of radiant energy reflected by the mass in at least two directions from the acceleration axis. The measurements of mass displacement are indicative of acceleration of the object and may conveniently be detected by observing voltage differences between electrodes generating the electrostatic fields which return the mass to its null position.

While the methods and apparatus of the invention have been discussed in connection with the measurement of acceleration along a single axis, the invention of course contemplates determinations of acceleration along multiple axes which involve mere duplication of the foregoing steps and arrangements. Various changes may be introduced in the particularly discussed method steps and modifications may be introduced in the illustrated apparatus without departing from the spirit and scope of the invention. Accordingly, the preferred practices and embodiments above-discussed are intended in an illustrative and not in a limiting sense. The true spirit and scope of the invention is defined in the following claims.

What is claimed is:

1. A method for use in determining acceleration of an object along an axis comprising the steps of:
   a. defining a volume fixedly positioned relative to said object;
   b. disposing in said volume a self-charging mass; then
   c. maintaining predetermined pressure in said volume such that said mass exhibits preselected electrical charge; then
   d. measuring each displacement of said volume relative to said mass along said axis; and, on each said displacement,
   e. establishing in said volume through an agency additional to said mass, an electrostatic field operative to position said mass in preselected position in said volume by disposing at least a pair of opposed electrode means in said volume and establishing a differential voltage therebetween; and providing in each said electrode means a first electrode and disposing a second electrode interiorly thereof and insulated therefrom so that said electrode static fields are conformed to a preselected configuration.

2. The method claimed in claim 1 wherein said step b is practiced by disposing in said volume a mass including radioactive material.

3. The method claimed in claim 1 wherein said step b is practiced by disposing in said volume a mass including radioactive material emitting substantially only beta rays or alpha rays.

4. The method claimed in claim 1 wherein said step e is further practiced by maintaining said second electrode at zero potential.

5. The method claimed in claim 1 wherein said step d is practiced by applying radiant energy to said mass and determining the relative amounts of said radiant energy reflected by said mass in at least two distinct directions from said axis.

6. A method for use in determining acceleration of an object along an axis comprising the steps of:
   a. defining a volume fixedly positioned relative to said object;
   b. disposing in said volume a self-charging mass; then
   c. maintaining predetermined pressure in said volume such that said mass exhibits preselected electrical charge; then
   d. measuring each displacement of said volume relative to said mass along said axis; and, on each said displacement,
   e. establishing in said volume an electrostatic field by applying respectively to first and second electrodes in said volume first and second potentials indicative of said displacement measuring and conforming said field to preselected configuration by providing conductive expanses in said electrodes and maintaining said expanses at potentials other than said first and second potentials.

7. The method claimed in claim 6 wherein said conductive expanses are maintained at zero potential.

8. The method claimed in claim 7 wherein said step b is practiced by disposing in said volume a mass including radioactive material.

9. The method claimed in claim 7 wherein said step b is practiced by disposing in said volume a mass including radioactive material emitting substantially only beta rays or alpha rays.

10. The method claimed in claim 7 wherein said step d is practiced by applying radiant energy to said mass and determining the relative amounts of said radiant energy reflected by said mass in at least two distinct directions from said axis.

11. Apparatus for use in measuring acceleration of an object along an axis comprising:
    a. first and second electrodes fixedly supported relative to said object in spaced relation along said axis;
    b. first means for applying voltages to said electrodes for establishing electrostatic fields therebetween;
    c. a self-charging mass exhibiting electrical charge disposed in preselected position in the space between said electrodes; and
    d. second means for sensing displacement of said mass along said axis from said preselected position thereof between said electrodes and generating output signals indicative thereof, said first means being operatively responsive to said second means output signals to apply voltages to said electrodes for establishing electrostatic fields for returning said mass to said preselected position.

12. The apparatus claimed in claim 11 wherein said mass comprises radioactive material.

13. The apparatus claimed in claim 11 wherein said mass comprises radioactive material emitting substantially only beta rays or alpha rays.

14. The apparatus claimed in claim 11 wherein said electrodes each comprise a first conductor and second conductor disposed interiorly of said outer conductor and insulated therefrom.

* * * * *